Patented Mar. 1, 1932

1,847,212

UNITED STATES PATENT OFFICE

WILLIAM FELDENHEIMER, OF LONDON, ENGLAND

MANUFACTURE OF CLAY

No Drawing. Original application filed March 14, 1924, Serial No. 699,346. Divided and this application filed October 30, 1925. Serial No. 65,893.

This invention is for an improved manufacture of clay, and is a continuation in part of my copending application, Serial No. 699,346, filed March 14, 1924.

I have found that if clay is flocculated with a strong acid or a salt thereof, superior properties are possessed by the flocculated product when it contains less flocculating agent than the quantity demanded to balance the deflocculator; in other words, if clay be brought into suspension in water by aid of a deflocculating agent and then flocculated, there is a marked diminution in the advantageous properties of the clay for a number of commercial uses when the flocculation has been effected in ordinary manner with a strong acid, or a sulphate, such as alum or sulphate of alumina—common flocculators for clay suspensions.

The flocculation of clay is not governed by chemical neutralization alone, but depends also upon the electrical charge of the clay particles, as well as upon the valency of the anions and kations. I have, therefore, chosen the term "balance" to define the action of the flocculating agent, rather than "neutralize", the latter being ordinarily construed with preference to chemical action.

The condition of clay which is produced by flocculation with a strong acid or the salt of a strong acid and which I have found renders the clay of reduced value for certain applications, for example, as a component of rubber, is conveniently referred to as "acidity"; but it will be appreciated by those acquainted with the art that the term as employed in this special connection has not necessarily the popular significance usually attached to it. Thus, clay of high "acidity" will be produced by effecting flocculation with the full amount of sodium sulphate, a perfectly neutral salt as usually understood.

As an example of the effect of such high acidity in flocculated clays, there may be instanced the comparative effects upon a rubber mix of a clay of high acidity such as is normally obtained on flocculation, and of a clay of lower acidity. When an excess of a strong inorganic acid or its salt, for example, hydrochloric acid, sulphuric acid, alum, or sulphate of alumina, has been used to effect flocculation, the addition of the flocculated clay to rubber mixes which are vulcanized to produce soft rubber goods not only retards the speed of vulcanization, but, in addition, affects deleteriously the properties of high breaking strain and tensile strength of the product, and also in some cases adversely affects the ageing properties. With some clays the concentration of alkaline deflocculator required to effect deflocculation is high, in which case the quantity of flocculator necessary for effecting flocculation is correspondingly high; and in some instances the amount of flocculator necessary may be two or three times that of the deflocculator required for the preceding deflocculation. In such a case, should the flocculator be, for example, alum or sulphate of alumina, a substantial part of the advantages derivable from deflocculation may be lost, and the results yielded by the rubber mix actually be substantially worse than those given by the same clay untreated by deflocculation. In all cases, whether the quantity of deflocculator required to defloc- culate the clay be high or low, it is desirable to employ as little flocculator as possible to effect flocculation should the flocculator be an acid or the salt of a strong acid.

According to this invention, there is provided as a new article of manufacture, flocculated clay inherently of low acidity, that is to say, a flocculated clay possessing of itself an acidity less than that of a clay which has been flocculated from its suspension in known manner by the addition of the requisite full quantity of a strong acid or a salt thereof.

By a flocculated clay is meant a clay which has been brought into aqueous suspension by the action of a deflocculating agent, a procedure well known in the art, and then, after removal of any undeflocculated matters, separated from the suspension by addition thereto of a flocculating agent.

The invention is therefore distinguished from that of U. S. Patent, No. 1,438,587, according to which a deflocculated clay suspension is evaporated directly to dryness, and from the invention of U. S. Patent, No.

1,458,693, wherein colloidal clay is admixed with an alkaline saponaceous material in the dry state, with or without an alkali; the clay in the former case being recovered while in the deflocculated condition, and in the latter case possessing low acidity, not inherently as previously defined herein, but in virtue of alkaline additions in the dry state.

The flocculated clay of low acidity may be obtained by flocculating the clay from its suspension in known manner by addition of a strong acid as defined, and then washing the flocculated product with water, or with a solution of an alkali in quantity sufficient to neutralize or to partially neutralize the acidity.

Alternatively, the clay may be prepared by effecting the flocculation with an alkaline base (such, for example, as lime), a weak acid or a salt thereof (such as the bicarbonate of an alkali metal, as is described in the specification of British Letters Patent, No. 106,890,) or with an organic acid (such as acetic acid).

A flocculated product of the required low acidity may also be obtained by effecting the flocculation with a strong acid (for example, sulphuric acid or a sulphate such as alum or sulphate of alumina) in presence of a soap forming colloid, for example, rosin, which reduces the concentration of the flocculator necessary for effecting flocculation.

I have found that advantageous results are obtained by bringing the clay into suspension in water by admixture with a dilute aqueous solution of an alkali pyrophosphate (for instance, normal sodium pyrophosphate) according to United States specification, No. 1,438,588, and flocculating the clay according to any of the above-mentioned methods.

When the clay to be treated is of the class resistant to peptization by a normal alkaline carbonate, such a carbonate may be employed for effecting the flocculation of the clay.

Certain clays are known which, instead of being deflocculated by the usual deflocculators, for example, normal sodium carbonate, or caustic soda, are flocculated by these reagents at certain concentrations. This behaviour of these clays may be turned to account for the purpose of the present invention by utilizing these alkaline reagents for effecting the flocculation, because whether the flocculator is alkaline, or not acid, the advantageous properties conferred upon clay by reduction of the acidity below that normally existant in products obtained by flocculation are to be observed in a greater or lesser degree.

Clay of low acidity, as hereinbefore defined, therefore, comprises flocculated clay which may be neutral or slightly alkaline.

Another means of obtaining the flocculated clay of low acidity is to reduce the degree of acidity after flocculation of the clay from its suspension. For example, it may be ascertained that a given quantity of an alkaline deflocculator is required in order to balance the acidity of the flocculated product, and this quantity of alkaline deflocculator may be added after the flocculation.

Like improved results have been obtained when the clay has been flocculated with sodium carbonate or calcium hydrate, or calcium hydrate together with sulphate of alumina, or in some cases when a colloid flocculator such as gelatine (e. g. glue) has been employed.

Different clays require different treatment in order to obtain the best results. For example, a Georgia clay from the Gordon district of Georgia was deflocculated by sodium pyrophosphate and found to require, relatively to the quantity of pyrophosphate, about three times the quantity of sulphate of alumina to effect flocculation. This clay when dried and put into a rubber mix gave on vulcanization a result inferior to that given by the same clay which had been deflocculated by a mixture of sodium pyrophosphate and sesquicarbonate of soda and then flocculated by one part of sulphate of alumina relatively to the total deflocculator, and this clay gave the best results, with those improved toughening properties and resistance to wear of the rubber composition, so desirable in rubber tyre manufacture.

It was found that clay from Lanvrian, Morbihan, France, required over twice the concentration of sulphate of alumina relatively to the quantity of deflocculator in order to effect flocculation after deflocculation by sodium pyrophosphate; whereas when barium hydrate was employed as deflocculator only half the quantity of sulphate of alumina, relatively to the quantity of barium hydrate, was necessary for flocculation.

An English clay from the Dartmoor district, after having been flocculated by sulphate of alumina and dried, was re-treated by rewashing and balancing the acidity by an alkaline deflocculator, namely, sodium pyrophosphate, so as to bring the finished clay to the alkaline side of the neutral point. Balancing was also effected by the addition of lime, the clay being the same as before, and in both these cases the results were superior to those given by clay which had been flocculated in the usual known manner.

The general effect of addition to vulcanizable rubber mixings of clay of low acidity as hereinbefore defined is to give not only an increased speed of cure, but what is much more important, a valuable increase in the breaking strain, and improved ageing and wearing properties of the vulcanized product, and these properties are usually found to be markedly superior to those possessed by rubber compositions compounded with clay having the higher degree of acidity consequent upon flocculation from its suspension in the ordinary manner with powerful acids or their salts.

The following is an example of effects attainable according to this invention:

(a) 8 lbs. of Florida clay from Leesburg were peptized (deflocculated) in six gallons of soft water by the addition of 1/2 oz. of sodium pyrophosphate and 3/4 grams of rosin. The resulting suspension was left to stand for the settlement of the impurities and the clay was then flocculated by the addition of 1/4 oz. of sulphate of alumina.

(b) The same clay was treated with pyrophosphate in the absence of rosin, and flocculated as before with sulphate of alumina. It was found that at least six times as much of the flocculator was required in order to effect the flocculation, and the physical properties in a vulcanized rubber mix were found to be inferior to those possessed by (a) and even inferior to the same clay without any treatment at all.

The choice of a suitable deflocculator for a particular clay is very important, for, as shown above, by changing the deflocculator or by using a mixture of deflocculating reagents, it is possible to reduce the quantity of the flocculator subsequently employed, and thus obtain a flocculated product of improved quality in respect to acidity.

It will be appreciated that the choice of the flocculating reagent in any particular case must be determined by circumstances, such as the nature of the clay, for different clays will not necessarily behave in the same manner towards a given deflocculator or flocculating reagent, as is indeed indicated by the fact already mentioned that reagents which are deflocculators for certain clays, such, for instance, as normal sodium carbonate and caustic soda, can be employed in the case of other clays as flocculating agents. It does not follow, therefore, that because a given flocculator can be successfully used to precipitate a given clay suspension, that the same reagent is applicable to a different clay, and when the properties of the latter are unknown a preliminary experiment must be performed to fix the most appropriate conditions of treatment.

By selecting a deflocculator for a given clay and a flocculator capable of reacting with the deflocculator to give a water-insoluble product, a rubber filler may be simultaneously produced with the clay of low acidity. For examlpe, barium hydroxide may be employed as the deflocculating reagent, and sulphuric acid or sulphate of alumina as the flocculator, whereby barium sulphate will be formed, a compound insoluble in water and frequently employed in rubber compositions as a filler.

What I claim as my invention and desire to secure by Letters Patent is:

1. The process of manufacture of clay which comprises the steps of suspending the clay in water by addition of an alkali pyrophosphate in the presence of compounds containing the radicals of rosin acids, removing any undeflocculated matter, and flocculating the clay from its suspension by the addition of a compound containing the acid radical of a strong acid.

2. The process of manufacture of clay which comprises the steps of suspending the clay in water by the addition of sodium pyrophosphate in the presence of rosin, removing any undeflocculated matter, and flocculating the clay from its suspension by the addition of a compound containing the acid radical of a strong acid.

3. The process of treating clay comprising the steps of deflocculating the clay, and flocculating the clay with a flocculator which reacts with the deflocculator to form wholly insoluble compounds only, whereby an insoluble precipitate is added to the flocculated clay, and the formation of a soluble compound is precluded.

4. The process of treating clay comprising the steps of deflocculating the clay, removing any undeflocculated matter, and flocculating the clay with less flocculator than that required to balance the deflocculator, the treatment being carried out in the presence of rosin and sodium pyrophosphate.

5. The process of treating clay comprising the steps of deflocculating the clay with an alkaline deflocculator and flocculating the clay with a flocculator which reacts with the deflocculator to form an insoluble compound, said reaction being of such nature as to preclude the formation of any soluble compound which tends to increase the acidity of the purified clay.

6. The process of treating clay, which comprises treating it with an inorganic deflocculating agent, removing any undeflocculated matter, and flocculating the clay by mixing therewith a flocculating agent in an amount less than the chemical equivalent of the deflocculating agent.

7. The process of manufacture of clay which comprises the steps of suspending the clay in water by means of an inorganic deflocculating agent, removing the undeflocculated matter and thereafter adding rosin and a flocculating agent to flocculate the clay from its suspension.

8. The process of manufacture of clay which comprises the steps of suspending the clay in water by means of an inorganic deflocculating agent, removing any undeflocculated matter, and thereafter adding a flocculating agent and a compound containing the radicals of rosin acids to flocculate the clay from its suspension.

9. The process of manufacture of clay which comprises the steps of suspending the clay in water by means of an inorganic deflocculating agent, removing undeflocculated matter, and thereafter adding rosin and a compound containing the acid radical of a strong acid to flocculate the clay from its suspension.

10. The process of manufacture of clay which comprises the steps of suspending the clay in water by means of an inorganic deflocculating agent, removing undeflocculated matter, and thereafter adding a compound containing the acid radical of a strong acid and a compound containing the radicals of rosin acids to flocculate the clay from its suspension.

11. The process of treating clay comprising the steps of deflocculating the clay, removing any undeflocculated matter, and flocculating the clay with less flocculator than that required to balance the deflocculator, the treatment being carried out in the presence of rosin and an alkali pyrophosphate.

12. The process of treating clay, which comprises treating it with an inorganic alkaline deflocculating agent, removing any undeflocculated matter, and flocculating the clay by mixing therewith a strong inorganic acid in amount less than the chemical equivalent of the deflocculating agent.

13. The process of treating clay, which comprises treating it with an inorganic alkaline deflocculating agent, removing any undeflocculated matter, and flocculating the clay by mixing therewith a salt of a strong inorganic acid in amount less than the chemical equivalent of the deflocculating agent.

14. The process of treating clay, which comprises treating it with an inorganic alkaline deflocculating agent, removing any undeflocculated matter and flocculating the clay by mixing therewith a compound containing the acid radical of a strong acid, the flocculator computed as aluminum sulphate being equal to not over one-half of the quantity by weight of the deflocculating agent.

15. The process of treating clay, which comprises treating it with an inorganic alkaline deflocculating agent, removing any undeflocculated matter, flocculating the clay by mixing therewith an excess of a compound containing the acid radical of a strong acid, and washing and neutralizing the clay with an alkali in amount acting as a flocculator.

In testimony whereof I have hereunto set my hand.

WILLIAM FELDENHEIMER.